Patented Nov. 21, 1939

2,180,814

UNITED STATES PATENT OFFICE 2,180,814

MANUFACTURE OF ANTHRACENE

William J. Mattox and Aristid V. Grosse, Chicago, Ill., assignors to Universal Oil Products Company, Chicago, Ill., a corporation of Delaware No Drawing. Application May 31, 1938, Serial No. 211,016

7 Claims. (Cl. 260—670)

This invention relates to the manufacture of anthracene by condensation involving the use of a particularly selective type of catalyst.

Anthracene is found in coal tar in amounts of less than ½%. The compound has a general formula $C_{14}H_{10}$, a melting point of 218° C., a boiling point of 342° C., and a structure corresponding to a chain of three benzene rings with common sides.

The above compound is the base for a large number of important derivatives in the drug and dye industry since it is easily sulfonated, nitrated, oxidized, and reduced. Therefore any process which makes it available in larger amounts is of importance in industry, and the present invention is concerned with a new and practical method for its production.

In one specific embodiment the present invention comprises the manufacture of anthracene by subjecting toluene to the action of catalysts comprising activated alumina supporting chromium sesquioxide at temperatures of 500–700° C., approximately atmospheric pressure and contact times of from 0.5 to 25 seconds.

The reaction which probably occurs when the preheated vapors of toluene are subjected to contact with the preferred catalyst is given in the following structural equation:

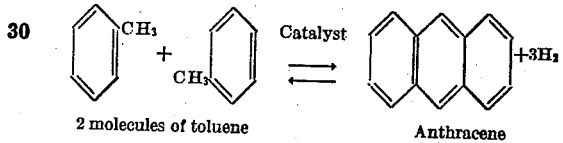

2 molecules of toluene        Anthracene

Under the conditions outlined and with due regard to the activity of the catalyst, the above reaction can be made the predominating one in any case. It will be observed that the essential reaction is one of dehydrogenation whereby hydrogen is lost from the substituting methyl group and from a point in the ortho-position therefrom so that the primary stage in the conversion is essentially one of dehydrogenation while the secondary or succeeding stage can be considered as one of condensation.

The preferred catalysts consist of activated aluminum oxide supporting less than 10% and preferably about 5% of chromium sesquioxide. It is essential to the preparation of these active catalysts that this aluminum oxide possess certain structural characteristics permitting the maintenance of a stable deposit of chromium sesquioxide on its surface which is essentially undisturbed under the conditions of operation and when regenerating by burning off carbonaceous deposits with air or other oxygen-containing gas mixtures. Aluminum oxide which is generally preferable as a base material for the manufacture of catalysts for the process may be obtained from some natural aluminum oxide minerals or ores such as bauxite or carbonates, such as dawsonite by proper calcination, or it may be prepared by precipitation of aluminum hydroxide from solutions of aluminum sulfate, nitrate, chloride, or different other salts, and controlled dehydration of the precipitate of aluminum hydroxide by heat. It may be desirable and advantageous to further treat it with air or other gases, or by other means to activate it prior to use.

Three hydrated oxides of aluminum occur in nature, to wit, hydrargillite or gibbsite having the formula $Al_2O_3 \cdot 3H_2O$, bauxite having the formula $Al_2O_3 \cdot 2H_2O$, and diaspore having the formula $Al_2O_3 \cdot H_2O$. Of these three minerals the oxides corresponding to the tri- and dihydrates are suitable for the manufacture of the present type of catalysts. The mineral dawsonite having the formula $Na_3Al(CO_3)_3 \cdot 2Al(OH)_3$ is another mineral which may be used as a source of aluminum oxide, the calcination of this mineral giving an alkalized aluminum oxide which is apparently more effective as a support in that the catalyst is more easily regenerated after a period of service. Alumina in the form of powdered corundum is not suitable as a base.

It is best practice in the final steps of preparing aluminum oxide as a base catalyst to ignite it for some time at temperatures within the approximate range of from 600 to 750° C. This does not correspond to complete dehydration of the hydrated oxides but gives a catalytic material of good strength and porosity so that it is able to resist for a long period of time the deteriorating effects of the service and regeneration periods to which it is subjected.

Our investigations have also definitely demonstrated that the catalytic efficiency of alumina, which has some catalytic potency in itself, is greatly improved by the presence of chromium sesquioxide in relatively minor amounts, usually of the order of less than 10% by weight of the carrier. It is most common practice to utilize catalysts comprising 2 to 5% by weight of this oxide, which is preferably produced in situ by the preliminary reduction of chromium trioxide or its salts, left as a residue after the ignition of adsorbed chromium nitrate or the precipitation of chromium hydroxide upon alumina granules.

The element chromium has several oxides, the four best known being $CrO$, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 300° C. The dioxide has been considered to be an equimolecular mixture of the trioxide and the sesquioxide. The oxides are readily developed on the surfaces and pores of alumina granules by utilizing primary solutions of chromic acid ($H_2CrO_4$) or chromic nitrate ($Cr(NO_3)_3$). The ignition of the chromic acid, the nitrate or a precipitated tri-hydroxide produces primarily the trioxide which is then reduced to the sesquioxide to furnish an active catalyst for use in the present reaction.

In the process of the present invention the operations are extremely simple and consist merely of vaporizing toluene or toluene-containing distillates at atmospheric or slightly superatmospheric pressures, preheating the vapors to temperatures within the range specified and passing them at a predetermined rate over granules or pellets of the catalysts described which may be contained in ordinary vertical cylindrical towers or in banks of tubes of relatively small diameter suitable for adding the necessary heat for maintaining the endothermic reaction. The products may be treated by fractionation and crystallization methods or any other method suitable for the recovery and/or direct utilization of the anthracene content. Such operations are generally well-known in the art and constitute no special feature of the present invention. The following example is given to illustrate the results normally obtainable in the operation of the present process though not with the object of unduly limiting the invention's proper scope.

The vapors of toluene were passed over an alumina-chromia catalyst comprising approximately 95% by weight of activated alumina and 5% by weight of chromium sesquioxide utilizing a temperature of 550° C., a pressure substantially atmospheric, and a time of contact of 18 seconds.

The yield of anthracene on a single pass amounted to approximately 5% by weight of the toluene charged, and by recycling, this yield was ultimately raised to 35%. The recovered anthracene was definitely identified by its physical constants showing a melting point of 208 alone and a mixed melting point with pure anthracene of 200–205° C. It was further identified by oxidation to anthraquinone showing a sharp melting point of 270° C.

We claim as our invention:

1. A process for the manufacture of anthracene which comprises subjecting toluene at a temperature of about 500–700° C. to contact with catalytic material comprising essentially a major portion of activated alumina and a minor portion of an oxide of chromium.

2. A process for the manufacture of anthracene which comprises subjecting the vapors of toluene at a temperature of about 500–700° C. to contact with granular catalytic material comprising essentially a major portion of activated alumina and a minor portion of an oxide of chromium.

3. A process for the manufacture of anthracene which comprises subjecting the vapors of toluene at a temperature of the order of 500° C. to contact with granular catalytic material comprising essentially a major portion of activated alumina and a minor portion of an oxide of chromium.

4. A process for the manufacture of anthracene which comprises subjecting the vapors of toluene at a temperature of the order of 500° C. at substantially atmospheric pressure to contact with granular catalytic material comprising essentially a major portion of activated alumina and a minor portion of an oxide of chromium.

5. A process for the manufacture of anthracene which comprises subjecting the vapors of toluene at a temperature of the order of 500° C. at substantially atmospheric pressure to contact for a time of the order of 0.5–25 seconds with granular catalytic material comprising essentially a major portion of activated alumina and a minor portion of an oxide of chromium.

6. A process for the manufacture of anthracene which comprises subjecting the vapors of toluene at a temperature of the order of 500° C. at substantially atmospheric pressure to contact for a time of the order of 0.5–25 seconds with granular catalytic material comprising approximately 95% by weight of activated alumina, 4% by weight of chromium sesquioxide, and 1% water.

7. A process for producing anthracene which comprises contacting toluene at a temperature of about 500–700° C. with a mixture of aluminum oxide and chromium sesquioxide.

WILLIAM J. MATTOX.
ARISTID V. GROSSE.